(12) United States Patent
Geisler et al.

(10) Patent No.: US 6,892,116 B2
(45) Date of Patent: *May 10, 2005

(54) VEHICLE INFORMATION AND INTERACTION MANAGEMENT

(75) Inventors: Scott P. Geisler, Clarkston, MI (US); Thomas William Creech, Clarkston, MI (US); Lisa Schreiner, Rochester Hills, MI (US); Stefano Marica, Farmington Hills, MI (US); Flavio Nardi, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/662,959

(22) Filed: Sep. 15, 2003

(65) Prior Publication Data

US 2004/0122562 A1 Jun. 24, 2004

Related U.S. Application Data

(63) Continuation-in-part of application No. 10/285,317, filed on Oct. 31, 2002.

(51) Int. Cl.⁷ .................................................. G06F 7/00
(52) U.S. Cl. ........................ 701/1; 701/35; 701/36; 701/211
(58) Field of Search .................................. 701/1, 33, 35, 701/36, 211, 212; 342/357.09; 340/425.5, 539.17

(56) References Cited

U.S. PATENT DOCUMENTS

| | | | |
|---|---|---|---|
| 5,617,325 A | 4/1997 | Schaefer | 716/6 |
| 5,774,367 A | 6/1998 | Reyes et al. | 716/6 |
| 5,796,624 A | 8/1998 | Sridhar et al. | 703/14 |
| 6,240,365 B1 * | 5/2001 | Bunn | 701/213 |
| 6,611,755 B1 * | 8/2003 | Coffee et al. | 701/213 |
| 6,738,696 B2 * | 5/2004 | Oi | 701/29 |

* cited by examiner

*Primary Examiner*—Gertrude A. Jeanglaude
(74) *Attorney, Agent, or Firm*—Kathryn A. Marra

(57) ABSTRACT

A method for vehicle information and interaction management. The method comprises receiving vehicle feature data and driver preference data for a vehicle. The method also comprises receiving an information message from the vehicle and a driving workload estimate that is indicative of current and previously occurring conditions. A control signal responsive to said vehicle feature data, said information message, said driver preference data and said driving workload estimate is provided to initiate the activation or disablement of a function of the vehicle.

22 Claims, 3 Drawing Sheets

| Function Description | Max. WL level where item is NOT managed |
|---|---|
| Automatic (vehicle generated) EMERGENCY call | NONE |
| Manually generated EMERGENCY call | |
| Collision Avoidance Warnings | |
| Critical Safety Messages (Ex: Brakes, Engine Overheated) | |
| Safety System Status Messages (Ex: ABS inoperative, note: Brakes still function here) | 90 |
| Vehicle Warning Messages (Ex: Engine Temperature, note: prior to Overheat) | |
| Navigation Turn-by-turn Instructions (General way-finding Instructions) | |
| Detailed Navigation Instructions (Ex: Intersection/Interchange detail) | 80 |
| Telephonic Interaction w/ Operator-assisted Service Center | 70 |
| Operationally Significant Vehicle System Status (Ex: Low Fuel) | 60 |
| Navigation Point-of-Interest search/display (find nearest gas station) | |
| "Basic" Telephonic Interaction w/ an automated Service Center | |
| Speech-Interface cellular phone activities | |
| Navigation Map Interactions | 50 |
| "Involved" Telephonic Interaction w/ an automated Service Center | |
| Voice-guided server browsing | 40 |
| Text-to-Speech read-back of E-Mail | |
| Manual interface w/ cellular pad (keypad) | 30 |
| Voice directed composition of E-Mail | 20 |
| Manual composition of E-Mail | 10 |

*FIG. 2*

| Vehicle Status Message (302) | Display Instruction (304) |
| --- | --- |
| Engine Overheated<br>Brakes Not Functioning<br>Collision Avoidance Warning (306) | Display Immediately |
| ABS Inoperative<br>Generator Not Functioning<br>Engine Temperature Rising<br>Low Fuel (308) | Delay Display up to M Minutes if Driving Workload Estimate (DWE) is Over W1 |
| Engine Oil Change Due<br>Tire Rotation Due (310) | Display if Vehicle Speed is Less Than S kph and DWE is Less Than W2 |

*FIG. 3*

VEHICLE INFORMATION AND INTERACTION MANAGEMENT

CROSS REFERENCE TO RELATED APPLICATIONS

The present application is a continuation-in-part of application Ser. No. 10/285,317, filed Oct. 31, 2002, which is herein incorporated by reference in its entirety.

BACKGROUND OF THE INVENTION

The present disclosure relates generally to vehicle information and interaction management and in particular, to a method of managing message delivery and access to vehicle features and functions based on a driving workload estimate.

Vehicles, such as automobiles, generally feature one or more displays to provide locally obtained information related to a current state of the vehicle. The display is positioned within the vehicle such that a driver of the vehicle can view information while driving the vehicle. For example, the display can provide information on a windshield, a dashboard or a steering wheel. Typically, each display contains one or more windows. Locally obtained information, such as the speed of the vehicle, the direction traveled by the vehicle, the outside air temperature, whether the air conditioner is in use, whether the hazard light is on, fuel status of the vehicle, and the like, is provided in these windows. In addition, information collected from vehicle sensors can be used to create vehicle status and maintenance messages for display in the windows. These messages include information such as "window washer fluid low" and "check tire pressure."

The current displays in vehicles are capable of providing different types of media from a variety of sources. The display provides audio, text, graphic images, and/or video (e.g., night vision display). Additionally, the display provides information from various databases and remote servers using a wireless network. For example, traffic and/or weather alerts is communicated through any of the display means mentioned above. In addition, smart advertising is transmitted to the display to inform the driver of a nearby restaurant or store. Providing all of these types of information and media can be helpful to the driver but providing it without considering the current driving situation may result in increased driver workload, driver distraction and/or decreased driving performance.

BRIEF DESCRIPTION OF THE INVENTION

One aspect of the present invention is a method for vehicle information and interaction management. The method comprises receiving vehicle feature data and driver preference data for a vehicle. In addition, the method also comprises receiving an information message from the vehicle and a driving workload estimate that is indicative of current and previously occurring conditions. A control signal responsive to said vehicle feature data, said information message, said driver preference data and said driving workload estimate is provided to initiate the activation or disablement of a function of the vehicle.

In another aspect, a system for vehicle information and interaction management comprises a network and a microprocessor in communication with the network. The microprocessor includes instructions to implement a method comprising receiving vehicle feature data and driver preference data for a vehicle via the network. The method also comprises receiving an information message for the vehicle via the network. In addition, the method comprises receiving a driving workload estimate that is indicative of current and previously occurring conditions. A control signal responsive to said vehicle feature data, said information message, said driver preference data and said driving workload estimate is provided to initiate the activation or disablement of a function of the vehicle.

In a further aspect, a computer program product for vehicle information and interaction management comprises a storage medium readable by a processing circuit and storing instructions for execution by the processing circuit for performing a method comprising receiving vehicle feature data and driver preference data for a vehicle. The method also comprises receiving an information message from the vehicle and a driving workload estimate that is indicative of current and previously occurring conditions. A control signal responsive to said vehicle feature data, said information message, said driver preference data and said driving workload estimate is provided to initiate the activation or disablement of a function of the vehicle.

BRIEF DESCRIPTION OF THE DRAWINGS

Referring to the exemplary drawings wherein like elements are numbered alike in the several FIGURES:

FIG. 2 is a hierarchical table that may be used by an exemplary embodiment of the present invention to determine access to vehicle functions; and FIG. 3 is a table of vehicle status messages including display instructions for use by an alternate exemplary embodiment of the present invention.

DETAILED DESCRIPTION OF THE INVENTION

Figure 1:
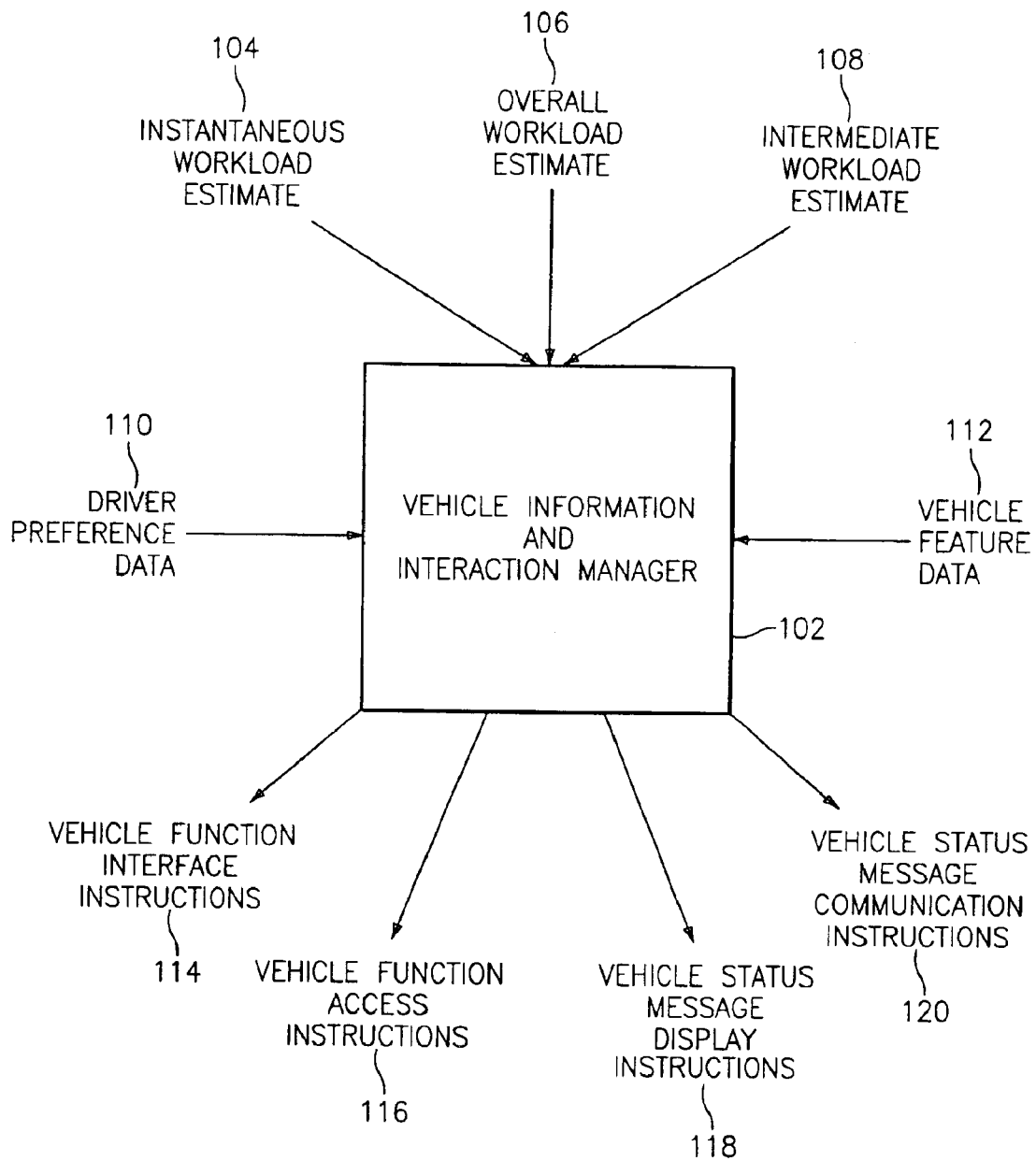
FIG. 1 is a block diagram of an exemplary system for performing vehicle information and interaction management.

A method of vehicle information and interaction management is presented. Briefly stated, the method weighs the estimated driving workload before displaying vehicle status messages and before allowing functions of the vehicle to be engaged. A driving workload estimate is input to the vehicle information and interaction manager. The driving workload estimate may include one or more inputs to represent vehicle and driving conditions. The driving workload estimate reflects both current and previously occurring conditions. The driving workload estimate is updated on a periodic basis (e.g., every second). Driver preference data and vehicle feature data are also input to the vehicle information and interaction manager. The vehicle information and interaction manager processes these inputs and initiates actions within the vehicle that affect vehicle messages, features and functions. These actions may include the timing of vehicle messages (e.g., message delay, message postponement), modification of the message presentation modality, feature or function access being disabled and modification of feature or function access.

FIG. 1 is a block diagram of an exemplary system for performing vehicle information and interaction management. An instantaneous workload estimate 104, an intermediate workload estimate 108 and an overall workload estimate 106, referred to collectively as a driving workload estimate, are input to a vehicle information and interaction manager 102. Also input to the vehicle information and interaction manager 102 is driver preference data 110 and vehicle feature data 112. The vehicle information and interaction manager 102 includes application code for creating vehicle function interface instructions 114, vehicle function access instructions 116, vehicle status message display instructions 118 and vehicle status message communication instructions 120.

The vehicle information and interaction manager 102 is located at a microprocessor (e.g., micro-controller, PLA) contained in the vehicle. The microprocessor may be dedicated to performing vehicle information and interaction manager 102 functions or, alternatively, the microprocessor may include application code for performing other vehicle functions along with the vehicle information and interaction manager 102 functions. Storage space for intermediate application results as well as application inputs and outputs may be located on the microprocessor or located on an external storage device accessible by the microprocessor. In addition, the microprocessor may be attached to a network that may provide communication internal to the vehicle, or in an alternate embodiment, communication with devices that are external to the vehicle as well.

The instantaneous workload estimate 104, intermediate workload estimate 108 and overall workload estimate 106 are expressed as numeric values and reflect relative workload levels. For example, the numeric value may range from one to one-hundred and the workload level may be measured relative to a reference state, such as a vehicle that is not moving or a vehicle where the ignition is not engaged. A new driving workload estimate is received on a periodic basis from a workload estimation system. The instantaneous workload estimate 104 reflects driving conditions based on a short time frame (e.g., the preceding zero to three seconds). For example, the act of turning the vehicle would have an impact on the instantaneous workload because it would add to the current driving workload and because turning is generally completed in a few seconds. The intermediate workload estimate 108 reflects driving conditions based on an intermediate time interval (e.g., the previous three seconds to three minutes) and may value the impact of states that continue to effect driving conditions or performance even after they are no longer present. For example, if the input data indicates that the driver has just completed a merge into traffic or exited a braking maneuver where the anti-lock brake system (ABS) was activated, the intermediate workload estimate 108 would reflect these events for a specified time interval. An event that affects the intermediate workload estimate 108 includes some recovery time for the driver. The overall workload estimate 106 reflects driving conditions based on a long term workload or the total workload accumulated during an ignition cycle. For example, the length of time that the driver has been operating the vehicle may have been factored into the overall workload estimate 106.

The driver preference data 110 may be used to set the level of management performed by the vehicle information and interaction manager 102. For example, the driver preference data could indicate a request for aggressive management, neutral management or minimal management. The neutral management could be set to display the "headlamp failed" message at moderate workload levels (e.g., three or lower on a five point scale) and an aggressive management setting might display the message at a lower workload level (e.g., two or lower on a five point scale). Further, a minimal manager might display the message at a higher level (e.g., four and lower on a five point scale). In this manner individual differences between drivers may be accounted for by the vehicle information and interaction manager 102. The vehicle feature data 112 is a list of the various functions provided in the vehicle and is utilized to initialize the vehicle information and interaction manager 102 for a particular vehicle.

Outputs from the vehicle information and interaction manager 102 include vehicle function interface instructions 114 and vehicle function access instructions 116. The vehicle function interface instructions 114 are used to activate or disable the types of interfaces that are available to particular devices that are attached to the vehicle (e.g., installed in the vehicle or part of the vehicle). Examples of possible interfaces include keypad and voice activation. The vehicle function access instructions 116 are used to activate or to disable particular functions of devices that are attached to the vehicle (e.g., installed in the vehicle or part of the vehicle). The access instructions may activate access to a particular device or disable access to the device. Vehicle status message display instructions 118 are used to activate or to disable particular vehicle status messages. Vehicle status message communication instructions 120 are used to determine the methods of communicating vehicle status messages.

FIG. 2 is a hierarchical table that may be used by the vehicle information and interaction manager 102 in an embodiment of the present invention to determine access to vehicle functions. FIG. 2 includes a table 200 of functions and an associated maximum workload estimate based on a workload estimate scale of one to one-hundred. The maximum workload estimate may be compared to all three components of the driving workload estimate or to a subset of the driving workload estimate data. Functions include vehicle status messages that may be listed individually, grouped together by like function or grouped together as one function, or entry, in the table 200. In addition, a function may be a manner of communicating a vehicle status message such as voice, standard text, bold text and video. Functions may also include access to a device attached to the vehicle or access to particular interfaces associated with a device attached to the vehicle. Devices attached to the vehicle include devices such as cellular phones, navigation devices, car stereo equipment, Internet news devices and electronic mail devices.

For example, the interface to a cellular phone may be managed by the vehicle information and interaction manager 102. The driver of the vehicle may only have access to the keypad on a cellular phone to dial outgoing phone calls and to answer incoming phone calls when the driving workload estimate is low (e.g., less than twenty on a scale of one to one-hundred). The driver may have access to the voice activated functions of the cellular phone until the driving workload estimate gets to a higher level (e.g., sixty on a scale of one to one-hundred). When the driving workload estimate reaches a certain level (e.g., sixty or higher on a scale of one to one-hundred) any use of the cellular phone may be disabled and the driver of the vehicle cannot access any functions associated with the cellular phone. A table, such as the one depicted in FIG. 2 may be used to implement these restrictions based on driving workload estimates.

Still referring to FIG. 2, the "manual composition of e-mail" entry 220 is associated with a maximum workload estimate of ten. The vehicle information and interaction manager 102 would use this information to disable access to manual composition of e-mail when the driving workload estimate is higher than ten. The "voice directed composition of e-mail" entry 218 is associated with a maximum workload estimate of twenty. Therefore, the vehicle information and interaction manager 102 would disable access to voice directed composition of e-mail when the driving workload estimate is higher than twenty. The "manual interface with cellular pad" entry 216 is associated with a maximum workload estimate of thirty. Therefore, the vehicle information and interaction manager 102 would disable access to making cellular phone calls on key pads when the driving workload estimate is higher than thirty. Similarly, the "voice guided server browsing" and "text-to-speech read back of e-mail" entries 214 are associated with a maximum workload estimate of forty and would be disabled when the driving workload estimate is higher than forty. The "navigation map interactions" and "involved telephonic interaction with an automatic service center" entries 212 are associated with a maximum workload estimate of fifty and would be disabled when the driving workload estimate is higher than fifty. The "operationally significant vehicle system status", "navigation point-of-interest search/display", "basic telephonic interaction with an automated service center" and "speech interface cellular phone activities" entries 210 are associated with a maximum workload estimate of sixty and would be disabled when the driving workload estimate is higher than sixty. The "telephonic interaction with operator assisted service center" entry 208 is associated with a maximum workload estimate of seventy and would be disabled when the driving workload estimate is higher than seventy.

Also as shown in FIG. 2, the "detailed navigation instructions" entry 206 is associated with a maximum workload estimate of eighty and would be disabled when the driving workload estimate is higher than eighty. Similarly, the "safety system status messages", vehicle warning messages" and "navigation turn by turn instructions" entries 204 are associated with a maximum workload estimate of ninety and would be disabled when the driving workload estimate is higher than ninety. Lastly, the "automatic emergency call", "manually generated emergency call", "collision avoidance warnings" and "critical safety messages" entries 202 do not have a maximum workload level and therefore would never be disabled by the vehicle information and interaction manager 102. The functions, groupings and maximum workload levels depicted in FIG. 2 are intended to be illustrative of the types of functions and associated workload levels that could be implemented using an embodiment of the present invention. A typical implementation of the vehicle information and interaction manager 102 would include many more functions than those illustrated in FIG. 2 and would be tailored for a particular vehicle. The tailoring could include different maximum workload levels and the use of a different scale for the workload estimates.

In an exemplary embodiment of the present invention, each function, such as those depicted in FIG. 2, may be associated with a subroutine for determining whether to activate or disable the function. The subroutine is part of the vehicle information and interaction manager 102 application code. For example, one of the functions may be a blinking display of the vehicle status message "low oil." A subroutine associated with this function could be called to determine if the blinking status message should be displayed. The subroutine could look at the overall workload estimate 106 and activate the message, or function, if the overall workload estimate is over a particular value (e.g., seventy on a scale of one to one hundred). This could be done because if the overall workload estimate 106 is causing the driving workload estimate to be over the threshold, the driving workload estimate might remain over the threshold until the ignition is turned off and it might make sense to display the message. However, the subroutine may check the instantaneous workload estimate 104 and the intermediate workload estimate 108 and disable the "low oil" message if one is over a pre-selected threshold and the overall workload estimate 106 is below a pre-selected threshold. In this way the functions may be activated and disabled by analyzing the three components of the driving workload estimate: the instantaneous workload estimate 104, the overall workload estimate 106 and the intermediate workload estimate 108.

In addition, the use of a subroutine may take into account driver preference data 110, vehicle data (e.g., wiper status, vehicle speed, oil level data and turn signal data), environment data (e.g., outside air temperature and side collision warning data) and current condition data (e.g., are radio controls being manipulated) to perform further analysis before making a determination about whether a function should be disabled or activated. For example, a subroutine may contain logic to disable a low washer fluid message if the driving workload estimate is above a pre-selected level and the wipers are not currently in use. Another example of using additional input is disabling a voice message to warn the driver of an object located behind the vehicle until the vehicle is in reverse gear. In this manner, the subroutines may be utilized to tailor the vehicle information and interaction manager 102 based on implementation requirements and available input data.

In an alternate exemplary embodiment of the present invention, an information message is input to the vehicle information and interaction manager 102 along with the driver preference data 110, vehicle feature data 112 and the driving workload estimate (represented as either a single value or as multiple values). The alternate exemplary embodiment of the present invention may limit the information message(s) from being instantly broadcast to the driver of the vehicle. Vehicle information messages are assigned severity levels. Based on the priority of the information and the urgency of the message, a message timing and maximum delay is assigned to each message. The vehicle information and interaction manager 102 is then capable of presenting the information to the driver of the vehicle according to the vehicle driving and condition contexts.

The decision to associate a particular priority level with a particular information message may be based on several factors such as the condition being identified and a determination of what change in vehicle performance results from the identified condition. An additional factor may include a determination of whether any change is noticeable to the driver of the vehicle without the message being displayed. Other factors may be related to importance (e.g. what are the consequences of the condition and the lack of action), urgency (how soon must the driver act) and the response to the condition (what can/should/must the driver do). Other considerations may be taken into account depending on specific implementation requirements.

FIG. 3 is a table of vehicle status messages including display instructions for use by an alternate exemplary embodiment of the present invention. Vehicle messages 302 are classified into display instructions 304 based on their priority levels. The first group of vehicle display messages 306 may include messages such as engine overheated, breaks not functioning and a collision avoidance warning. These messages may correspond to the display immediately display instruction 304. This group of messages may refer to the highest level priority conditions that threaten the overall integrity of the powertrain systems and/or the operation of the moving vehicle. The presence of these conditions would be delivered to the driver of the vehicle regardless of the workload estimate.

A second group of vehicle status messages 308 depicted in FIG. 3 are those that do not indicate an immediate threat to vehicle integrity or operation so that their broadcast to the driver may be timed to the overall driving context/environment. For example, because a running vehicle's electrical system can continue to operate (for some period) without a functional generator, it is not required that the driver be informed immediately of this status. However, since continued driving without a functioning generator may raise the risk of system failure, a maximum delay of "M" minutes may be assigned to this condition. "M" will be assigned a pre-selected value (e.g. 2, 5,) 60 that may vary based on factors such as vehicle type and mileage on vehicle. Messages fitting into this category may be at a medium priority level and include ABS inoperative, generator not functioning, engine temperature rising and low fuel. As depicted in FIG. 3, display of these messages may be delayed for up to "M" minutes if the driving workload estimate is above a pre-selected level, denoted as "W1" (e.g., fifty, ten). Alternatively, the display of the messages may be delayed for "M" minutes regardless of the driving workload estimate.

A third group of vehicle status messages 310 depicted in FIG. 3 include those that are not deemed to be important or urgent while the vehicle is moving. Examples of these low priority level messages may include vehicle maintenance reminders such as engine oil change due and tire rotation due. In general, these type of messages may not be directly acted upon while driving and are programmed to allow for a delayed response from the driver. These messages may be held and displayed when the vehicle is not moving or is moving below a pre-selected speed. Alternatively, these messages may be held until the vehicle is moving below a pre-selected speed, "S" (e.g. 5 mph), and/or the driving workload estimate is below a pre-selected level, "W2." In an exemplary embodiment of the present invention, "W2" will be a lower workload estimate value than "W1."

Other status vehicle status messages 302 and display instruction 304 schemes may be implemented in an alternate embodiment of the present invention. For example, display instructions 304 may also be based on the values of other data available to the vehicle information and interaction manager 102. Example of other data that may be available include environmental data (e.g., outside air temperature, time of day), current condition data (e.g., phone in use) and vehicle data (e.g., brake position). In addition, any combination of vehicle status messages 302 and display instructions 304 may be implemented in an alternate embodiment of the present invention. In addition, the vehicle status messages 302 are separated into three groups in FIG. 3, but any number of vehicle status message 302 groupings may be implemented in an alternate embodiment of the present invention. Further, the vehicle status message communication instructions 120 may vary based on the display instructions 304.

The disclosed invention provides the ability to weigh the estimated driving workload before displaying vehicle status messages and before allowing functions of devices in the vehicle to be activated. The vehicle information and interaction manager 102 may be tailored based on three estimated workload levels, based on driver preference data, and based on a variety of vehicle and environment inputs. Staging the vehicle status messages presented to the driver may result in better communication with the driver and in higher driver satisfaction with the vehicle. The driver is not bombarded with every vehicle status message that applies at every minute but instead may be presented with vehicle status messages in a controlled manner. In addition, the ability to disable particular functions of devices in the vehicle from being engaged based on an estimated driving workload and other inputs may lead to less distracted drivers.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for vehicle information and interaction management, said method comprising:

receiving vehicle feature data and driver preference data for a vehicle;

receiving an information message from the vehicle;

receiving a driving workload estimate, said driving workload estimate indicative of current and previously occurring conditions; and providing a control signal responsive to said vehicle feature data, said information message, said driver preference data and said driving workload estimate to initiate the activation or disablement of a function of the vehicle.

2. The method of claim 1 wherein said function of the vehicle is to display said information message.

3. The method of claim 1 further comprising:

accessing a table of vehicle status messages; and locating at least one of said vehicle status messages corresponding to said information message, wherein said at least one vehicle status message includes a display instruction and said control signal is further responsive to said display instruction.

4. The method of claim 3 wherein said display instruction includes display immediately, delay display for a pre-selected period of time if the driving workload estimate exceeds a first pre-selected level, or display immediately if the speed of the vehicle is below a pre-selected speed and the driving workload estimate is less than a second pre-selected level.

5. The method of claim 4 wherein said pre-selected period of time is two minutes.

6. The method of claim 4 wherein said pre-selected speed is five kilometers per hour.

7. The method of claim 3 wherein said display instruction includes display immediately or delay display for a pre-selected period of time.

8. The method of claim 1 wherein said driving workload estimate includes an instantaneous workload estimate.

9. The method of claim 1 wherein said driving workload estimate includes an intermediate workload estimate.

10. The method of claim 1 wherein said driving workload estimate includes an overall workload estimate.

11. The method of claim 1 wherein said function includes a vehicle status message corresponding to said information message.

12. The method of claim 11 wherein said disablement includes delaying a display of said vehicle status message and said activation includes displaying said vehicle status message.

13. The method of claim 1 wherein said function includes a manner of communicating a vehicle status message corresponding to said information message.

14. The method of claim 13 wherein said manner of communicating is display, voice or video.

15. The method of claim 1 further comprising receiving internally generated vehicle data and wherein said providing a control signal is further responsive to said vehicle data.

16. The method of claim 1 further comprising receiving environment data and wherein said providing a control signal is further responsive to said environment data.

17. The method of claim 1 further comprising receiving current condition data and wherein said providing a control signal is further responsive to said current condition data.

18. The method of claim 1 further comprising receiving telematic data and wherein said providing a control signal is further responsive to said telematic data.

19. A system for driving workload estimation, the system comprising:

a network; and a microprocessor in communication with said network, said microprocessor including instructions to implement a method comprising:

receiving vehicle feature data and driver preference data for a vehicle via said network;

receiving an information message from the vehicle via said network;

receiving a driving workload estimate from said network, said driving workload estimate indicative of current and previously occurring conditions; and providing a control signal responsive to said vehicle feature data, said information message, said driver preference data and said driving workload estimate to initiate the activation or disablement of a function of the vehicle.

20. The system of claim 19 wherein said network is a wireless network.

21. The system of claim 19 wherein said network in the Internet.

22. A computer program product for driving workload estimation, the product comprising:

a storage medium readable by a processing circuit and storing instructions for execution by the processing circuit for performing a method comprising:

receiving vehicle feature data and driver preference data for a vehicle;

receiving an information message from the vehicle;

receiving a driving workload estimate, said driving workload estimate indicative of current and previously occurring conditions; and providing a control signal responsive to said vehicle feature data, said information message, said driver preference data and said driving workload estimate to initiate the activation or disablement of a function of the vehicle.

* * * * *